United States Patent
Alzner et al.

(10) Patent No.: US 7,061,003 B2
(45) Date of Patent: Jun. 13, 2006

(54) PHOTO-STIMULABLE IMAGE PLATE RESTORATION ASSEMBLY

(75) Inventors: Edgar Alzner, Garden City, NY (US); Stephen Zamprelli, Bardonia, NY (US); Eddy Paultre, West Hempstead, NY (US); Walter Gross, Massapequa, NY (US)

(73) Assignee: Air Techniques, Inc., Hicksville, NY (US)

( * ) Notice: Subject to any disclaimer, the term of this patent is extended or adjusted under 35 U.S.C. 154(b) by 328 days.

(21) Appl. No.: 10/356,204

(22) Filed: Jan. 31, 2003

(65) Prior Publication Data
US 2004/0149941 A1 Aug. 5, 2004

(51) Int. Cl.
*G01N 23/04* (2006.01)

(52) U.S. Cl. .................. 250/588; 250/581; 250/580
(58) Field of Classification Search .............. 250/588, 250/581, 580
See application file for complete search history.

(56) References Cited

U.S. PATENT DOCUMENTS

| | | | | | |
|---|---|---|---|---|---|
| 4,752,687 | A | * | 6/1988 | Yamada ...................... | 250/588 |
| 4,902,023 | A | * | 2/1990 | Opresko et al. ............ | 277/628 |
| 5,276,333 | A | * | 1/1994 | Robertson ................. | 250/484.4 |
| 6,140,663 | A | * | 10/2000 | Neary et al. ................ | 250/588 |
| 6,191,426 | B1 | * | 2/2001 | Hayakawa et al. ....... | 250/484.4 |
| 6,815,703 | B1 | * | 11/2004 | Iwakiri ...................... | 250/588 |

* cited by examiner

*Primary Examiner*—David Porta
*Assistant Examiner*—Christine Sung
(74) *Attorney, Agent, or Firm*—Clifford G. Frayne; Louis E. Marn

(57) ABSTRACT

An erasure assembly for imaging plates comprised of a cover member and a base member, the cover member in the form of an inverted rectangular tray having a plurality of light sources and reflective sources mounted therein behind a diffuser glass member, the base member, complimentary with the cover member having a support area for the placement of imaging plates on their non-reactive surface, their photo-stimulable surface facing upwardly, the cover member closed upon the base member and there being a control means to activate the light sources for a time sufficient to erase the retained images on the photo-stimulable surface of the image plates.

5 Claims, 6 Drawing Sheets

PHOTO-STIMULABLE IMAGE PLATE RESTORATION ASSEMBLY

RELATED APPLICATIONS

Applicant claims the benefit of provisional application No. 60/354,463, filed Feb. 5, 2002.

BACKGROUND OF THE INVENTION

1. Field of the Invention

The present invention relates to digital medical and/or dental imaging systems which utilize reusable photo-stimulable phosphor (PSP) imaging plates, and more particularly, to a restoration assembly which erases or clears the residual information from a previous x-ray exposure prior to reuse of the imaging plate.

2. Description of the Prior Art

Photo-stimulable phosphor (PSP) imaging plates record an image as a result of x-ray exposure. The exposed imaging plate is then scanned or read by a scanner which digitally stores the image in a computer processing unit. Since the imaging plates are reusable, the residual information must be erased from the imaging plate before it is reused. There are automatic imaging systems available wherein the imaging plates are not manually handled and these systems perform this erasure function internally.

However, there are many systems that require manual handling of the imaging plates such as those associated in the dental arts with dental scanners or image readers. In these systems, the user must expose the imaging plates to a light source of a known power for a sufficient length of time so that the total energy per unit area has adequately erased or deleted the previous residual image data. Typically an erasure of 95.5 percent is sought. Such erasing in a manual system requires a 60,000 LUX-second of fluorescent light for intraoral imaging plates and double that amount for extraoral imaging plates. If incandescent light is utilized, the erasure requires 120,000 LUX-second of incandescent for intraoral imaging plates and twice that amount for extraoral imaging plates. Other arguments by physicists have indicated that energy of as much as 750,000 Lux-sec is required for adequate or acceptable erasing of such image plates.

The existing technology associated with the manual handling of the image plates recommends the placing of the imaging plates face down on the horizontal surface of a view box or clipped to the vertical surface of a wall mounted view box. The lowest measured light intensity at any given point on the view box would determine the amount of time required for restoration by dividing the exposure requirement by this intensity.

This existing procedure introduces several factors which adversely affect imaging plates. The surface of the view box may be dusty or have particulate matter adhering thereto which in turn adheres to the image surface of the imaging plate and thereby possibly degrading subsequent images. Still further in positioning the imaging plate on the view box and removing it from the view box, the imaging surface of the imaging plate may be scratched leading to premature degradation and may affect any subsequent exposure images. Still further there may be surface imperfections on the view box which will cause shadows on the imaging plate thereby not allowing complete erasure of the plates at these locations. Additionally, manipulating the plates on such surfaces invariably cause the users to touch the imaging surface of the imaging plate leading to the deposit of body oils and acids on the sensitive surface which further prematurely degrades the plates useful life and affect any subsequent images. Finally, since light sources decrease unpredictably in their light emitting intensity with time, the light box emitting light intensity must be monitored regularly to assure adequate erasure or else excessive erasure time must be given. Applicant's restoration assembly addresses and alleviates the adverse effects and conditions heretofore mentioned.

OBJECTS OF THE INVENTION

An object of the present invention is to provide for a novel restoration assembly in the form of an imaging plate holder for exposure to fluorescent or incandescent light for the erasing of residual images thereon.

Another object of the present invention is to provide for a novel restoration assembly for imaging plates which position such imaging plates for erasure without causing contact to the imaging surface of the imaging plate.

A still further object of the present invention is to provide for a novel restoration assembly for imaging plates which allows for the placement and removal of the imaging plates along their edges and eliminating imaging surface contamination by body oils or acids.

A still further object of the present invention is to provide for a novel restoration assembly in which the imaging surface of the imaging plate is positioned for erasure without having to contact the surface of the light box.

A still further object of the present invention is to provide for a novel restoration assembly which can accommodate all sizes of intraoral film.

A still further object of the present invention is to provide for a novel restoration assembly erasing in a short period of time, in an automatically timed short period of time and measuring the intensity of the erasing lamps to alert the user to degradation of light intensity.

SUMMARY OF THE INVENTION

A restoration assembly for imaging plates comprised of a cover member and a base member, the cover member in the form of an inverted rectangular tray having a plurality of light sources and reflective sources mounted therein behind a diffuser glass member, the base member, complimentary with the cover member having a support area for the placement of imaging plates on their non-reactive surface, their photostimulable surface facing upwardly, the cover member closed upon the base member and there being a control means to activate the light sources for a time sufficient to erase the retained images on the photostimulable surface of the image plates. In one embodiment the base member and cover member are in hinged relationship and in a separate embodiment, the base member is in slidable relationship with the cover member. Further, the support member within the base member in one embodiment is smooth yet resilient to allow the user to depress the surface along the edges of the image plates to remove them from the base support member without contacting the photostimulable surface; and in another embodiment, the support member within the base member is formed with a plurality of parallel channels providing a surface with alternating crests and troughs such that the imaging plates can be positioned on the crests and slightly apart allowing the user to engage the imaging plates about along the edges and avoid contaminating the photostimulable surface.

BRIEF DESCRIPTION OF THE DRAWINGS

These and other objects of the present invention will become apparent particularly when taken in light of the following illustrations wherein.

DETAILED DESCRIPTION OF THE DRAWINGS

Figure 1:
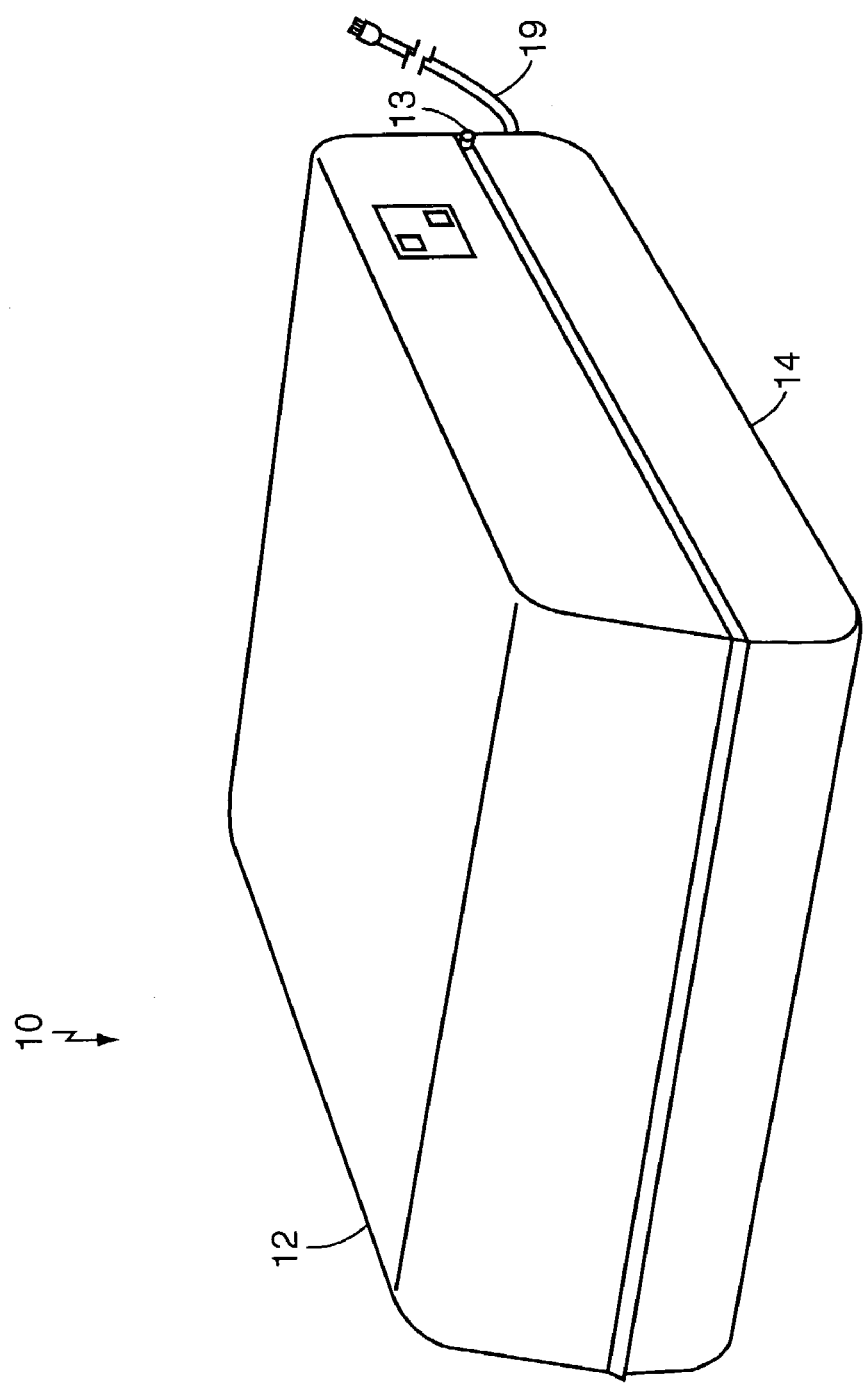
FIG. 1 is a perspective view of the restoration assembly in a closed position.
Figure 2:
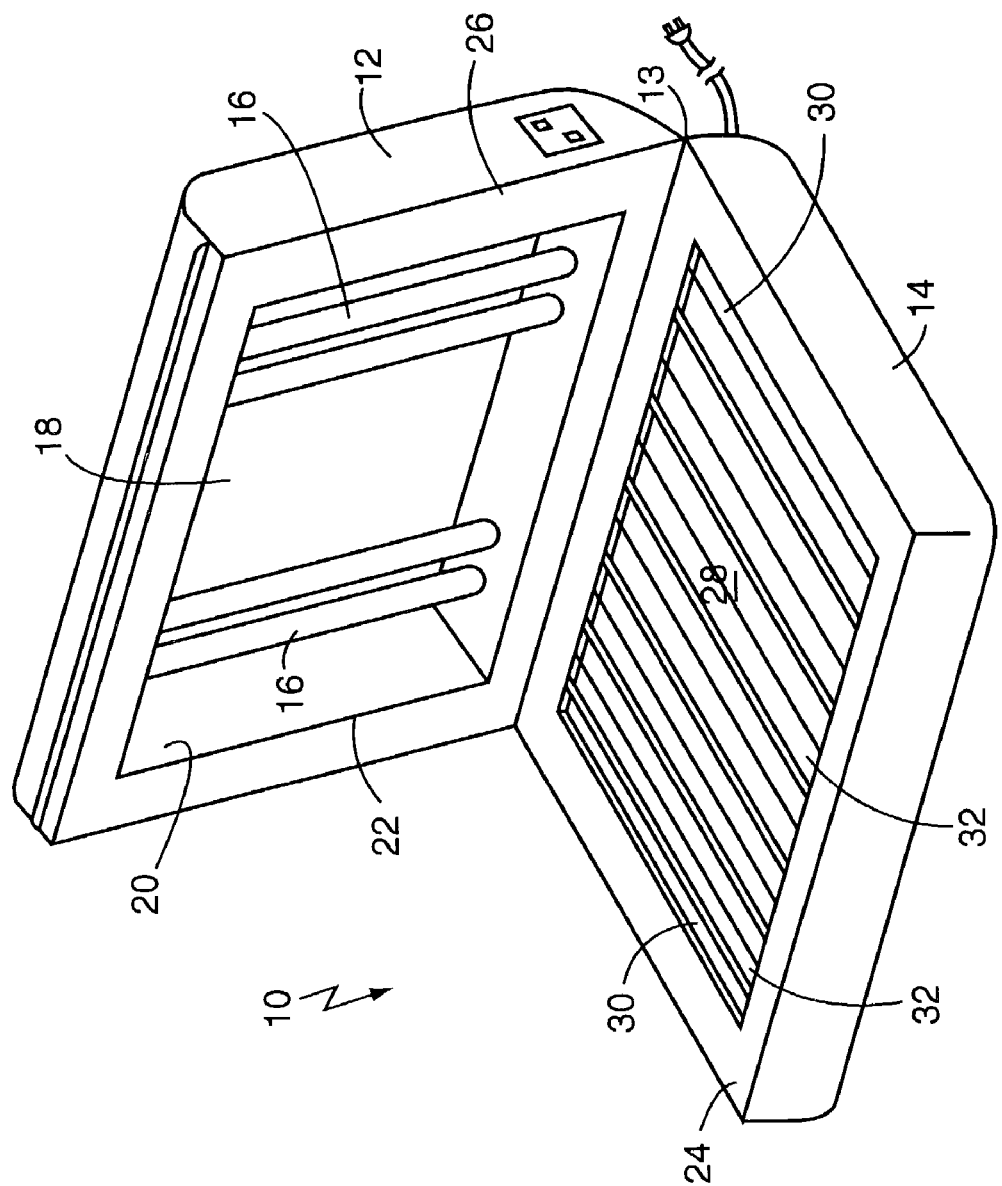
FIG. 2 is a perspective view of the restoration assembly in the open position illustrating one embodiment of the support member for the imaging plates.

FIG. 1 is a perspective view of the restoration assembly of the present invention in a closed position and FIG. 2 is a perspective view of a restoration assembly of the present invention in an open position. The restoration assembly 10 is comprised of a cover member 12 and a base member 14. In the embodiment illustrated in FIGS. 1 and 2, these members are hingeably engaged along one peripheral edge 13, however, they could be two separate members which interlock. Cover member 12 and base member 14 are complimentary in their cross sectional area with cover member 12 resembling an inverted tray in which a light source 16 and appropriate reflective members 18 are positioned, light source 16 being in communication with a power source 19 by way of control panel 21. Light source 16 and reflective members 18 are recessed within a cavity 20 which cavity is overlaid with a transparent diffuser glass 22.

Base member 14 in the embodiment illustrated in FIG. 2 has a periphery 24 cooperative with the periphery 26 of cover member 12. Contained within the periphery 24 of base member 14 is a support surface 28 for imaging plates. In the embodiment illustrated in FIG. 2, the support surface 28 comprises a series of crests 30 and troughs 32 alternating from one lateral edge to an opposing lateral edge, but could also alternate from one longitudinal edge to the other longitudinal edge. The distance between adjacent crests 30, or the width of the trough 32 is such so that the restoration assembly 10 can accommodate the various film sizes 0–4 of extra oral and panoramic. The crests 30 and troughs 32 allow the user to position the imaging plates by holding them by the edges and thus insuring no contamination of the photo-stimulable surface by body oils or acids. In grasping the imaging plates by the edges, the user can place the imaging plates non-reactive side facing down on the crests 30 with the fingers depending into the trough. When the quantity of imaging plates to be erased are positioned on the crest 30 on support surface 28, cover 12 would be closed and the light source activated. The height of support surface 28 within base member 14 is such that when the cover 12 is closed, there is a gap of approximately at least ⅛th of an inch between the crests 30 and the diffuser glass 22, thus insuring no contact with the photo-stimulable surface of the imaging plate. It should be noted that the restoration assembly 10 of the embodiment illustrated in FIGS. 1 and 2 can also be dimensioned to handle extra oral imaging plates. The support surface 28 is preferably constructed of a white or silver reflective material which is non-porous and can be removed and cleaned as necessary, the reflectivity improving the erasing and decreasing the erasing time. In the embodiment illustrated, which is for dental imaging plates, the area of illumination (i.e. the dimension of the diffuser glass 22) would preferably be 8 inches by 12 inches. However, a restoration assembly 10 of the present invention utilized for medical size imaging plates could be larger.

Figure 3:
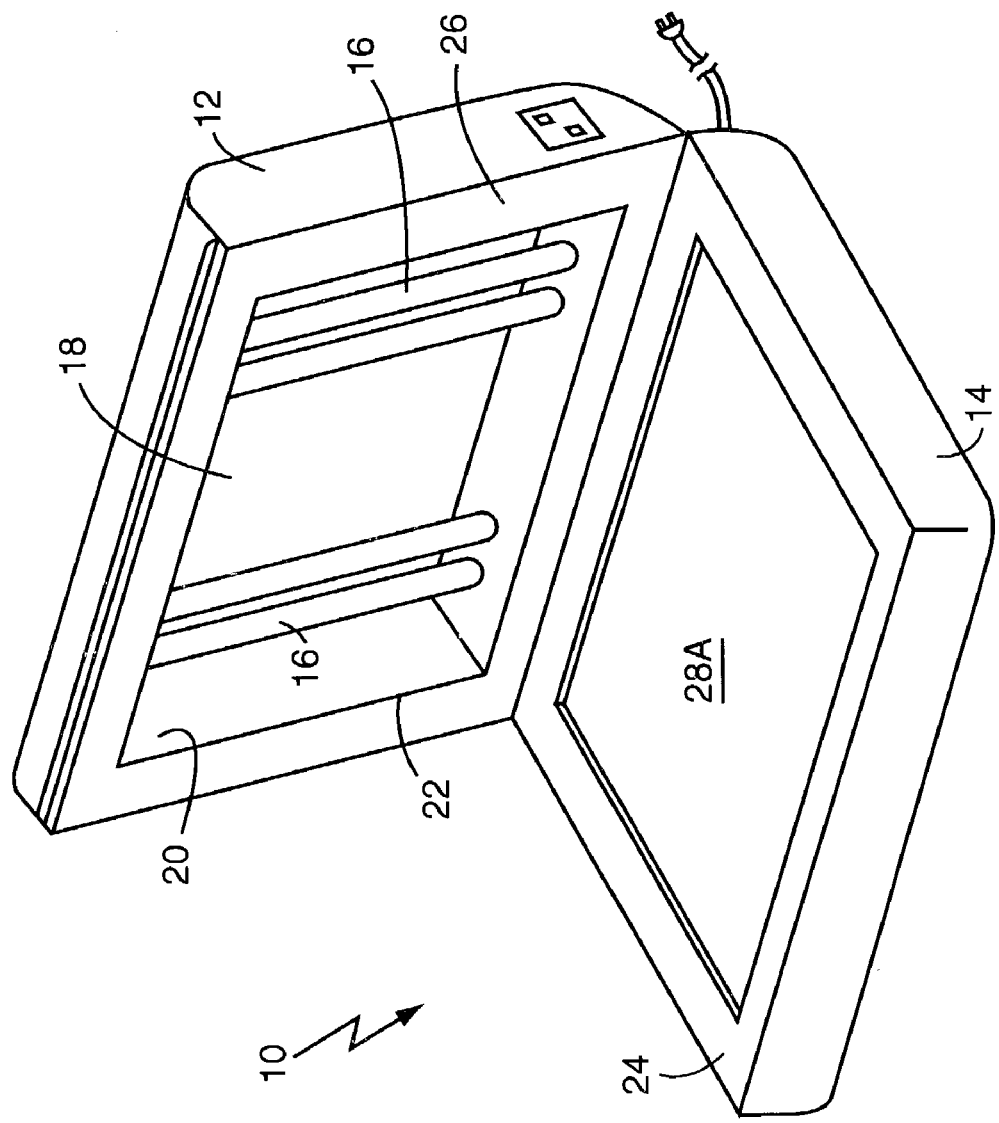
FIG. 3 is a perspective view of the restoration assembly in an open position illustrating a second embodiment of the support member for the imaging plates.
Figure 5:
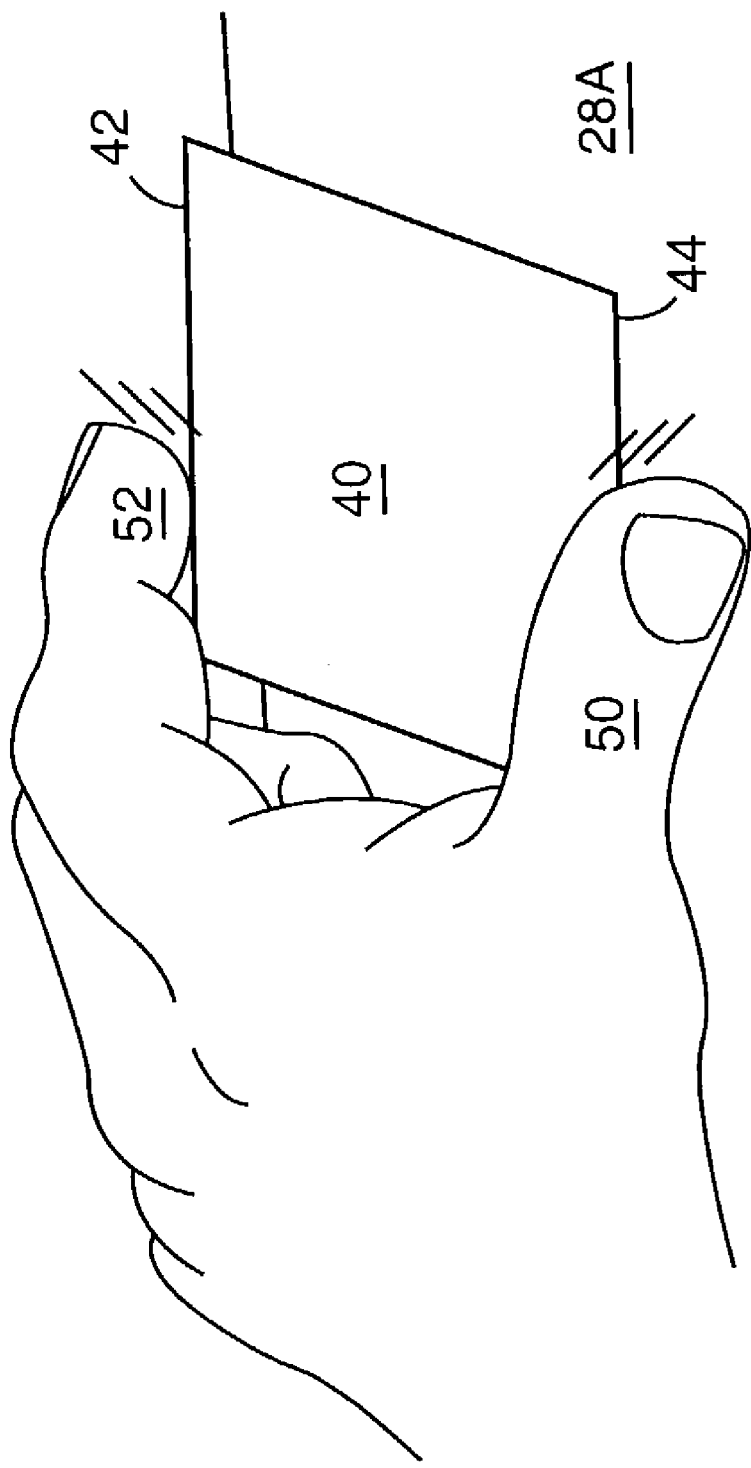
FIG. 5 is a perspective view of illustrating the manner in which the imaging plates may be lifted from the support member illustrated in FIG. 3.
Figure 6:
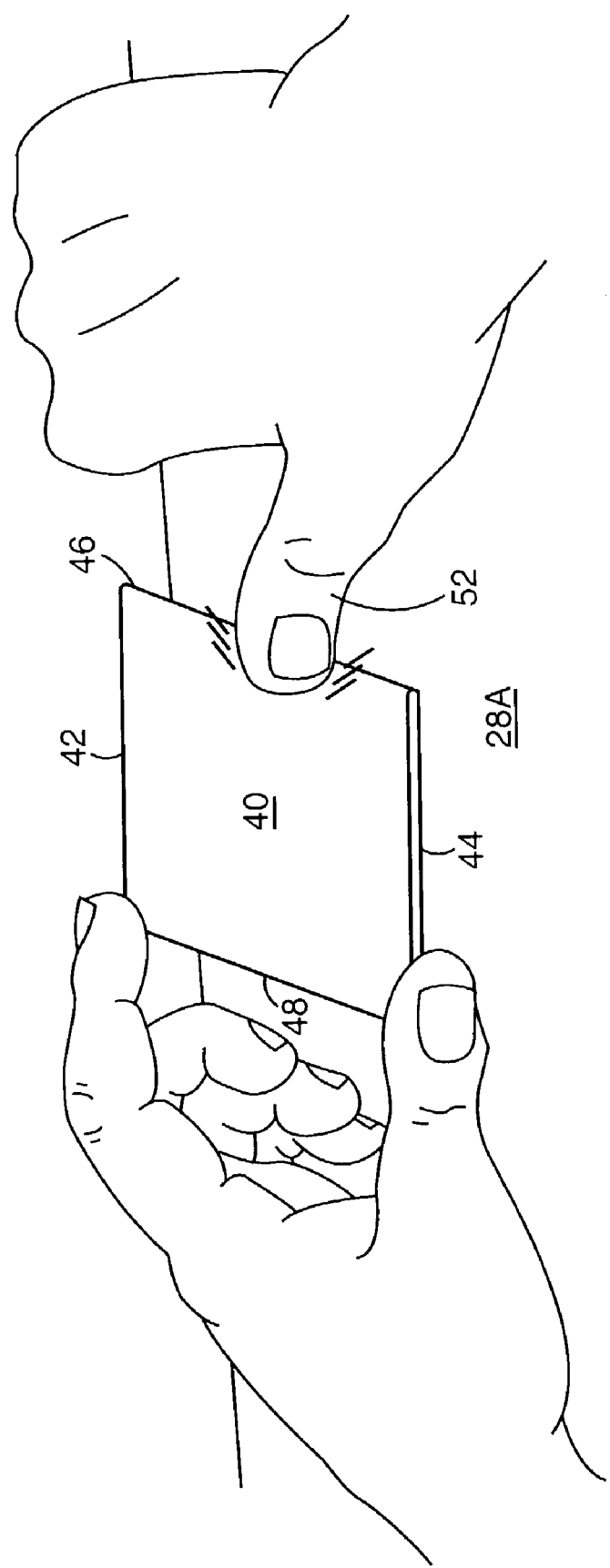
FIG. 6 is a perspective view illustrating another manner in which the image plates can be removed from the support surface as illustrated in FIG. 3.

FIG. 3 illustrates restoration assembly 10 with a second embodiment of a support surface. In FIG. 3, support surface 28A is of one elevation and is constructed of a non-porous resilient material. In this configuration, the imaging plates are positioned on support surface 28A with their unreactive side facing down and the photo-stimulable surface facing upwardly. The machine would operate in the same fashion as the embodiment shown in FIGS. 1 and 2. The embodiment illustrated in FIG. 3 allows the user to remove the imaging plates by depressing the surface 28A along two opposing edges of the imaging plate, thus avoiding contamination of the photo-stimulable surface by body oils or body acids. Surface 28A is white or silver reflective to improve erasing illuminate and reduce erasing time. FIGS. 5 and 6 are illustrative of the manner in which the imaging plates can be removed from support surface 28A of the embodiment illustrated in FIG. 3.

FIG. 5 illustrates one manner in which the image plate 40 may be removed from support surface 28A. The user would grasp the opposing edges 42 and 44 of image plate 40 with the thumb 50 and index finger 52, slightly depressing the support surface 28 to lift image plate 40. FIG. 6 illustrates another manner in which the image plate may be removed from support surface 28A. In this illustration, the thumb 52 is utilized to depress surface 28A at one edge 46 of image plate 40, thus causing the opposing edge 48 to lift from support surface 28A permitting the individual to grasp the image plate along edges 42 and 44 by the thumb and forefinger of the opposing hand.

Figure 4:
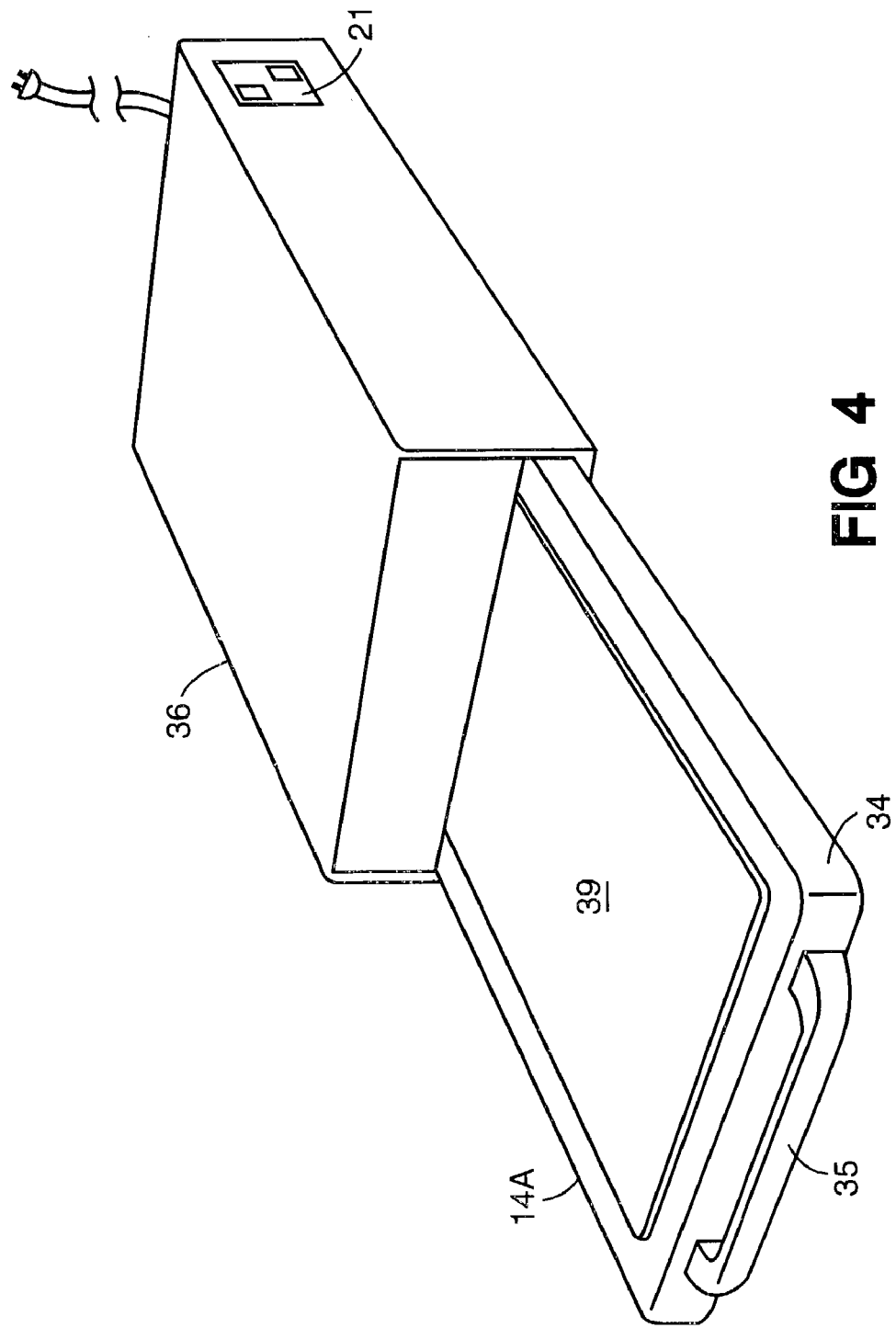
FIG. 4 is a perspective view of a slidable drawer version of the restoration assembly.

FIG. 4 illustrates yet another embodiment of the restoration assembly 10 of the present invention. In this configuration, a base member 14A consists of a slidable tray 34 slidably receivable within a cover member 36 which incorporates the lighting means 16 (not shown) and a control panel 21. The tray member 34 would have a handle 35 at one end and a support surface 39 for positioning the imaging plates, photo-stimulable surface side up. The support surface 39 could comprise the crest and trough configuration of FIG. 2 or the smooth surface of FIG. 3. The imaging plates would be positioned on the support surface 39 and tray 34 would be manually slid into cover member 36 at which time the lighting means 16 would be activated for the desired time of exposure.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

We claim:

1. A restoration assembly for photo-stimulable imaging plates, which comprises:

a base member having a cavity defined by a peripheral surface portion;

support means disposed in said cavity of said base member for positioning imaging plates thereon by grasping side edge portions with imaging sides thereof facing upwardly therefrom;
a cover member having a cavity defined by a peripheral surface portion, said peripheral surface portion cooperating with said peripheral surface portion of said base member upon positioning of said cover member on said base member;
a light source disposed in said cavity of said cover member;
light diffuser member enclosing said cavity of said cover member and disposed proximate said peripheral surface portion of said cover member, said light diffuser member being spaced apart from said support means of said base member during restoration protocol;
light reflective means disposed in said cavity of said cover member behind said light source; and
control means for activating said light source to regenerating imaging capability of imaging plates positioned on said support means of said base member.

2. The restoration assembly as defined in claim 1 wherein said base member and cover member are hingeably mounted to each other.

3. The restoration assembly as defined in claim 1 wherein said base member is slidably positioned within said cover member.

4. The restoration assembly as defined in claim 1 wherein said support means for said imaging plates is formed of a resilient non-porous material.

5. The restoration assembly as defined in claim 1 wherein said support means for said imaging plates is formed of a series of crests and troughs.

* * * * *